United States Patent [19]

Morita et al.

[11] Patent Number: 4,765,408
[45] Date of Patent: Aug. 23, 1988

[54] MICELLAR SLUG FOR OIL RECOVERY

[75] Inventors: Hiroshi Morita, Chiba; Yasuyuki Kawada, Odawara; Junichi Yamada; Toshiyuki Ukigai, both of Chiba, all of Japan

[73] Assignee: Lion Corporation, Tokyo, Japan

[21] Appl. No.: 844,438

[22] Filed: Mar. 26, 1986

[30] Foreign Application Priority Data

Mar. 28, 1985 [JP] Japan .................................. 60-62132

[51] Int. Cl.$^4$ ........................................... E21B 43/22
[52] U.S. Cl. .................................... 166/274; 166/273; 252/8.554
[58] Field of Search ............... 252/8.55 D, 554, 8.554; 260/513 R; 166/274, 273

[56] References Cited

U.S. PATENT DOCUMENTS

| | | | |
|---|---|---|---|
| 1,985,747 | 12/1934 | Steindorff et al. | 260/513 R |
| 2,241,421 | 5/1941 | Price et al. | 260/513 R |
| 3,506,070 | 4/1970 | Jones . | |
| 3,990,515 | 11/1976 | Wilchester et al. . | |
| 4,017,405 | 4/1977 | Holm . | |
| 4,018,278 | 4/1977 | Shupe . | |
| 4,059,154 | 11/1977 | Braden et al. . | |
| 4,066,124 | 1/1978 | Carlin et al. . | |

FOREIGN PATENT DOCUMENTS

| | | | |
|---|---|---|---|
| 260110 | 11/1961 | Australia | 260/513 R |
| 1223831 | 5/1965 | Fed. Rep. of Germany | 260/513 R |
| 0062286 | 4/1983 | Japan | 252/8.554 |
| 0131295 | 8/1983 | Japan | 252/8.554 |
| 2138866 | 10/1984 | United Kingdom | 166/274 |
| 2137676 | 10/1984 | United Kingdom | 166/274 |

Primary Examiner—Herbert B. Guynn
Attorney, Agent, or Firm—Armstrong, Nikaido, Marmelstein & Kubovcik

[57] ABSTRACT

A micellar slug for use in the recovery of oil, consisting essentially of a surfactant and an aqueous medium, which may contain an inorganic salt. The surfactant contains:

(a) at least one alkoxy sulfonate having the general formula (I):

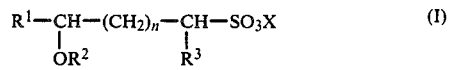

wherein $R^1$ represents an alkyl group having 1 to 26 carbon atoms, $R^2$ represents an alkyl or alkenyl group having 1 to 24 carbon atoms, $R^3$ represents hydrogen or an alkyl group having 1 to 24 carbon atoms, n is a number of 0 to 5, and X represents an alkali metal, an alkaline earth metal, ammonium, or an organic amine, and (b) at least one other surfactant.

The micellar slug obtains large intake amounts of oil and brine in the resultant micro-emulsions and a good dilution stability of the micro-emulsion, and is capable of recovering oil from subterranean reservoirs having a high salt content at a high oil recovery efficiency.

5 Claims, 1 Drawing Sheet

MICELLAR SLUG FOR OIL RECOVERY

BACKGROUND OF THE INVENTION

1. Field of the Invention

The present invention relates to a micellar slug suitable for use in a micellar drive for recovering oil (i.e., petroleum) from subterranean reservoirs. More specifically, it relates to a micellar slug having large intake amounts of oil and brine in the resultant micro-emulsions and a good dilution stability of the micro-emulsion, capable of recovering oil from subterranean reservoirs having a high salt content at a high oil recovery efficiency.

2. Description of the Prior Art

Micellar drive is known in the art as one of the so-called "enhanced oil recovery (EOR)" methods for recovering oil from oil-bearing subterranean reservoirs. According to the known micellar drive methods, microemulsions comprising water, oil, surfactants, and cosurfactants are injected under pressure into the subterranean reservoirs, or aqueous solutions of water, surfactants, and cosurfactants are injected into the subterranean reservoirs to form micro-emulsions therein, for the recovery of oil remaining in the subterranean reservoirs. Various processes and chemicals have been heretofore studied in the art. The micellar drive methods and chemicals are disclosed in, for example, U.S. Pat. Nos. 3506070, 3990515, 4017405, 4018278, 4059154, and 4066124.

These prior arts disclose various kinds of anionic, cationic, and nonionic surfactants as surfactants suitable for use in the micellar drive methods and also disclose various kinds of lower alcohols as cosurfactants suitable for use in the micellar drive methods.

However, the micellar drive methods utilizing surfactants and lower alcohols are disadvantageous in that, since the partition coefficients of the surfactants and the lower alcohols to oil and water are different, the desired high oil recovery capability of the microemulsions cannot be maintained in the subterranean reservoirs due to the dilution thereof with oil and water, and the formation of the micro-emulsions having large intake amounts of oil and water is difficult.

SUMMARY OF THE INVENTION

The objects of the present invention are to eliminate the above-mentioned disadvantages in the conventional micellar drive methods and to provide, for the recovery of oil from subterranean reservoirs of a high oil recovery efficiency, a micellar slug having good dilution stability of the oil recovery capability of the microemulsion formed therefrom and large intake amounts of oil and brine in the micro-emulsion formed therefrom.

Other objects and advantages of the present invention will be apparent from the following description.

In accordance with the present invention, there is provided a micellar slug, for use in the recovery of oil, consisting essentially of a surfactant and an aqueous medium, which may contain an inorganic salt. The surfactant contains:

(a) at least one alkoxy sulfonate having the general formula (I):

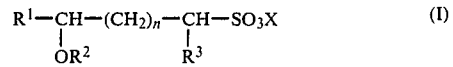

wherein $R^1$ represents an alkyl group having 1 to 26 carbon atoms, $R^2$ represents an alkyl or alkenyl group having 1 to 24 carbon atoms, $R^3$ represents hydrogen or an alkyl group having 1 to 24 carbon atoms, n is a number of 0 to 5, and X represents an alkali metal, an alkaline earth metal, ammonium, or an organic amine, and (b) at least one other surfactant.

BRIEF DESCRIPTION OF THE DRAWING

The present invention will be better understood from the description set forth below with reference to the accompanying drawing, in which correlations between the mixing ratio of the surfactants (i.e., the $C_{14}$–$C_{18}$ methoxy sulfonate and the sodium $C_{18}$–$C_{20}$ internal olefin sulfonate) and the solubilization parameter and the optimum salinity obtained in Example 1 are graphically shown.

DESCRIPTION OF THE PREFERRED EMBODIMENTS

Figure 1:
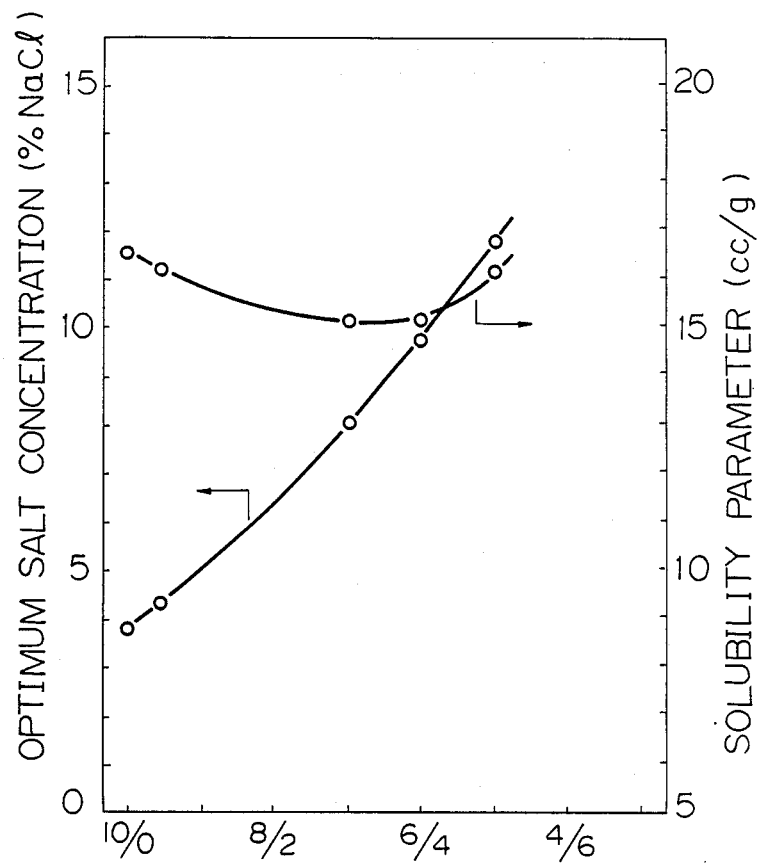

The micellar slugs desirably used for the recovery of oil are transparent or dispersed liquids containing about 0.1% to 15% by weight of a surfactant in an aqueous medium.

The alkoxy sulfonates having the above-mentioned general formula (I) usable as the first component (a) are surfactants obtained by sulfonating $\alpha$-olefins or internal olefins having 8 to 26 carbon atoms in any conventional manner and, then reacting the sulfonated products with alcohols having 1 to 24 carbon atoms, followed by neutralizing the reaction products with appropriate bases. The olefins used in the abovementioned reaction may be straight or branched chain olefins. The preferable $\alpha$-olefins are straight chain $\alpha$-olefins and vinylidene-type branched olefins.

The alkoxy sulfonates having the general formula (I) used in the present invention usually contain about 45% by weight or less, especially 5% to 45% by weight of alkenyl sulfonates and about 20% by weight or less, especially 1% to 20% by weight of disulfonate.

The alkoxy sulfonates having the general formula (I) usable in the present invention are used in the form of alkali metal salts, alkaline earth metal salts, ammonium salts, and organic amine salts thereof. The preferable counter cations are Na, K, Ca, Mg, $NH_4$, and alkanol ammoniums.

Examples of the alkoxy sulfonates suitable for use in the present invention are those obtained from $\alpha$-olefins having 8, 10, 12, 13, 14, 15, 16, 17, 18, 20, 22, 24, 12–16, 13–14, 14–16, 14–18, 15–17, 16–18, 17–20, and 20–24 carbon atoms or internal olefins having 8, 10, 12, 14, 15, 16, 17, 18, 19, 20, 21, 22, 23, 24, 26, 8–12, 13–14, 14–17, 17–20, 20–24, and 17–26 carbon atoms. These olefins may be used alone or in any mixtures thereof. These alkoxy sulfonates may be preferably used in an amount of 0.01% to 12% by weight in the micellar slug.

The alcohols for reacting with the sulfonated products of $\alpha$-olefins or internal olefins, when the alkoxy sulfonates used in the present invention are produced, are natural or synthetic alcohols having 1 to 24 carbon atoms, more preferably lower alcohols having 1 to 4 carbon atoms. These alcohols may be used alone or in any mixture thereof. Typical examples of such alcohols are methanol, ethanol, n-propanol, isopropanol, n-butanol, isobutanol, and t-butanol.

The other surfactants usable as the second component (b) of the surfactant in the present micellar slug include, for example, internal olefin sulfonates (i.e., "IOS") having 10 to 26 carbon atoms, paraffin sulfonates having 10 to 26 carbon atoms, petroleum sulfonates having an average molecular weight of 300 to 600, alkyl or alkylphenol ethoxylate ($\bar{p}=1$ to 10) having 6 to 24 carbon atoms, alkyl or alkylphenol ethoxy sulfates ($\bar{p}=1$ to 10) having 6 to 24 carbon atoms, alkyl or alkylphenol ether sulfonates having 6 to 24 carbon atoms and having 1 to 10 ether groups a molecule, and alkylxylene or alkyltoluene sulfonates having 15 to 28 carbon atoms. These sulfonates may be used alone or in any mixture thereof.

The other surfactants are preferably used in an amount of 0.03% to 13% by weight in the micellar slug. These other surfactants are used together with the above-mentioned alkoxy sulfonates.

Water or brine having an inorganic salt concentration of 0 to about 30% by weight, preferably about 2% to about 25% by weight, can be used as an aqueous medium for the preparation of the micellar slug of the present invention, since the surfactants used in the micellar slug of the present invention have good salinity tolerance and hard-water resistance. The aqueous medium usable in the formation of the micellar slug of the present invention includes soft water, brine, and water in subterranean reservoirs, for example, rain water, river water, lake water, formation water, oil stratum water, and seawater. Typical examples of inorganic salts contained in the brine are NaCl, KCl, $Na_2SO_4$, $K_2SO_4$, $MgCl_2$, and $CaCl_2$. Examples of divalent metal ions are an Mg ion and Ca ion. These divalent metal ions can be present in an amount of up to about 20000 ppm.

The aqueous medium is preferably used in the micellar slug in an amount of 60% to 99.9% by weight.

When it is desired to control the viscosity of the micellar slugs of the present invention, an appropriate known thickening agent such as a water-soluble polymer, lower alcohols, and hydrocarbons can be added to the micellar slugs. Examples of thickening agents usable in the formation of the micellar slugs are heteropolysaccharides produced by microbes, napthalene-sulfonic acid-formaldehyde condensates, polyacrylamides, polyacrylates, hydroxyethylcelluloses, and carboxymethylcelluloses. Examples of the lower alcohols optionally used in the present micellar slug are straight or branched alcohols having 1 to 8 carbon atoms. However, since the use of too large an amount of these lower alcohols unpreferably causes a decrease in the oil recovery efficiency, the lower alcohols are preferably used in an amount of 2% by weight or less, if used.

Examples of the hydrocarbons optionally used in the present invention are petroleum, liquefied petroleum gas, crude gasoline (naphtha), kerosine, diesel oil, and fuel oil. Recovered petroleum is preferably used due to its low cost and availability as well as its composition, which is identical or similar to that of the oil remaining in the subterranean reservoirs.

According to the present invention, oil can be practically effectively and advantageously recovered from subterranean reservoirs at an extremely high recovery efficiency since the above-mentioned disadvantages of the conventional enhanced oil recovery methods can be effectively eliminated. Thus, when the micellar slug according to the present invention is used, a high oil recovery efficiency can be maintained even if the micro-emulsions are diluted with oil and water in subterranean reservoirs and the intake amounts of oil and water into the micro-emulsion can be remarkably increased.

The micellar slugs of the present invention can be readily obtained by any known method of production. For example, the ingredients including the surfactants and the aqueous medium can be mixed in any order by using conventional mixing devices, mixing temperatures, and mixing pressures.

The recovery of oil from subterranean reservoirs can be carried out, by means of any conventional micellar drive method, by using the micellar slugs of the present invention. For instance, a method by which the micellar slugs are injected under pressure into at least one injection well of the subterranean reservoirs. Then at least one driving fluid, such as flood water and/or an aqueous solution of the above-mentioned thickening agent (i.e., biopolymers such as Xanthan gum, hydrophillic polymers such as polyacrylamides and polysaccharides, and cellulose derivatives such as carboxymethylcelluloses and hydroxyethylcelluloses), is injected into the injection well so as to transfer to drive the remaining oil toward an oil production well and to recover the oil from the production well. The suitable amount of the micellar slugs injected into the injection well is about 1% to about 200% by volume of the porosity of the subterranean reservoirs, although this is not critical.

EXAMPLES

The present invention now will be further illustrated by, but is by no means limited to, the following Examples, in which the component ratios or amounts of samples used are based on "% by weight" unless otherwise specified.

EXAMPLE 1

Mixtures of sodium alkoxy sulfonates (i.e., "$C_{14}$–$C_{18}$ methoxy sulfonates" hereinbelow) prepared from $C_{14}$–$C_{18}$ α-olefins and methanol and $C_{18}$–$C_{20}$ IOS.Na surfactants having varying mixing ratios were used as a surfactant component. These mixtures were charged as a surfactant component, together with 5 ml of sodium chloride aqueous solutions having various concentrations and 5 ml of n-octane, into test tubes so that the surfactant concentration became 4%.

The contents of the test tubes were mixed while stirring at a temperature of 100° C. for one minute. After allowing the tubes to stand, micro-emulsions were formed. Of these middle phase micro-emulsions thus formed, the concentrations of the sodium chloride at which the amounts of the n-octane and the sodium chloride aqueous solution incorporated into the micro-emulsion of the middle phase became equal to each other was defined as an optimum salinity and the amount of the n-octane or the sodium chloride aqueous solution per 1 g of the surfactant at the optimum salt concentration was defined as a solubilization parameter.

The correlations of the optimum salinity and the solubilization parameter vs the mixing ratio of the surfactant are as shown in FIG. 1.

It should be noted that the $C_{14}$–$C_{18}$ methoxy sulfonates did not form middle phase micro-emulsions at a sodium chloride concentration of 0 to 26%.

EXAMPLE 2

A translucent uniform fluid for oil recovery was prepared by mixing, under stirring, 1.8% of the $C_{14}$–$C_{18}$ methoxy sulfonates, 2.7% of $C_{14}$–$C_{20}$ IOS.Na, 0.5% of $C_{12}$–$C_{14}$ branched secondary alcohol ethoxy ($\bar{p}=3$) hydroxypropane sulfonate, 10% of n-decane, and 85.0% of brine containing 2.3% of sodium chloride, 0.44% of calcium chloride, and 0.11% of magnesium chloride.

The oil recovery test was carried out by using a Berea sandstone core having a length of 60 cm and a diameter of 3.8 cm, and having a permeability of about 200 mD and a porosity of about 20%. A core sufficiently saturated with brine containing 3.75% of sodium chloride, 0.7% of calcium chloride, and 0.15% of magnesium chloride was set in a core holder and then n-decane was injected under pressure into the core at a feed rate of 6 cc/min until no brine was discharged. The brine was then injected under pressure at the same feed rate in water flooding until the content of the n-decane in the effluent became less than 0.1%. Thus, the n-decane was recovered. After the water flooding, the core holder and the micellar slug were placed in a constant temperature bath at a temperature of 96° C.

The micellar slug was first injected under pressure into the core in an amount of 25% by volume of the pore volume, a 1% aqueous sodium chloride solution containing 2500 ppm of xanthan gum was then injected under pressure in an amount of 100% by volume of the pore volume and, finally, a 1% aqueous sodium chloride solution was injected under pressure in an amount of 100% by volume of the pore volume. Thus, the oil was recovered. The injection rate under pressure was 1 foot/day.

The oil recovery efficiency was determined by measuring the amount of water in the core after the test in a toluene azeotropic method to convert the recovered amount of the oil. As a result, it was found that 94% of the oil was recovered.

EXAMPLE 3

A transparent micellar slug for oil recovery was prepared by mixing, under stirring, 2.9% of the $C_{14}$ methoxy sulfonate, 0.7% of $C_{12}$–$C_{14}$ branched secondary alcohol ethoxy ($\bar{p}=3$) hydroxypropane sulfonate, 10% of n-dodecane, and 86.4% brine containing 12.4% of sodium chloride, 4.7% of calcium chloride, and 0.8% of magnesium chloride.

The oil recovery test was carried out by using a Berea sandstone core having a length of 28 cm and a diameter of 3.8 cm, and having a permeability of about 200 mD and a porosity of about 20%. A core sufficiently saturated with brine containing 15.3% of sodium chloride, 5.8% of calcium chloride, and 1.0% of magnesium chloride was set in a core holder and then n-dodecane was injected under pressure into the core at a feed rate of 6 cc/min until no brine was discharged. The brine was then injected under pressure at the same feed rate in water flooding until the content of the n-dodecane in the effluent became less than 0.1%. Thus, the n-dodecane oil was recovered. After the water flooding, the core holder and the micellar slug were placed in a constant temperature bath at a temperature of 105° C.

The micellar slug was first injected under pressure into the core in an amount of 25% by volume of the pore volume, a 15% aqueous sodium chloride solution containing 2500 ppm of hydroxyethyl cellulose was then injected under pressure in an amount of 100% by volume of the pore volume and, finally, a 10% aqueous sodium chloride solution was injected under pressure in an amount of 100% by volume of the pore volume.

Thus, the oil was recovered. The injection rate under pressure was 1 foot/day.

The oil recovery efficiency was determined by measuring the amount of water in the core after the test in a toluene azeotropic method to convert the recovered amount of the oil. As a result, it was found that 92% of the oil was recovered.

We claim:

1. A micellar slug free of lower alcohols for use in the recovery of oil, consisting essentially of 0.1% to 15% by weight of a surfactant and an aqueous medium, which may contain an inorganic salt, said surfactant containing:
   (a) 0.01% to 12% by weight based on the amount of the micellar slug of at least one alkoxy sulfonate having the general formula (I):

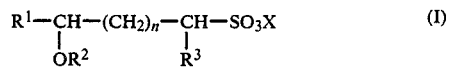

wherein $R^1$ represents an alkyl group having 1 to 26 carbon atoms, $R^2$ represents an alkyl or alkenyl group having 1 to 24 carbon atoms, $R^3$ represents hydrogen or an alkyl group having 1 to 24 carbon atoms, n is a number of 0 to 5, and X represents an alkali metal, an alkaline earth metal, ammonia, or an iorganic amine, and
   (b) at least one other surfactant which is a member of the following group, a sulfonate, sulfate, and ethoxylate surfactant.

2. A micellar slug as claimed in claim 1, wherein said alkoxy sulfonate contains about 45% by weight or less of an alkenyl sulfonate and about 20% by weight or less of a disulfonate.

3. A micellar slug as claimed in claim 1, wherein the concentration of the aqueous medium in the micellar slug is 60% to 99.9% by weight.

4. A micellar slug as claimed in claim 1, wherein the inorganic salt concentration of the aqueous medium is 0% to about 30% by weight.

5. A process for producing oil from an oil-bearing subterranean reservoir penetrated by wells, which comprises the steps of:
   (1) injecting into said reservoir through an injection well a micellar slug free of lower alcohols consisting essentially of 0.1% to 15% by weight of a surfactant and an aqueous medium, which may contain an inorganic salt, said surfactant containing:
      (a) 0.01% to 12% by weight based on the amount of the micellar slug of at least one alkoxy sulfonate having the general formula (I):

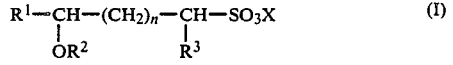

wherein $R^1$ represents an alkyl group having 1 to 26 carbon atoms, $R^2$ represents an alkyl or alkenyl group having 1 to 24 carbon atoms, $R^3$ represents hydrogen or an alkyl group having 1 to 24 carbon atoms, n is a number of 0 to 5, and X represents an alkali metal, an alkaline earth metal, ammonia, or an organic amine, and
      (b) at least one other surfactant which is a member of the following group, a sulfonate, sulfate, and ethoxylate surfactant, and
   (2) injecting into said reservoir at least one driving fluid; and
   (3) recovering oil from said reservoir through the production well.

* * * * *